(12) United States Patent
Mejdrich et al.

(10) Patent No.: US 8,248,415 B2
(45) Date of Patent: Aug. 21, 2012

(54) USER-DEFINED NON-VISIBLE GEOMETRY FEATURING RAY FILTERING

(75) Inventors: Eric Oliver Mejdrich, Rochester, MN (US); Paul Emery Schardt, Rochester, MN (US); Robert Allen Shearer, Rochester, MN (US); Matthew Ray Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 12/360,989

(22) Filed: Jan. 28, 2009

(65) Prior Publication Data

US 2010/0188402 A1 Jul. 29, 2010

(51) Int. Cl.
G06T 15/50 (2011.01)
G06T 15/00 (2011.01)
G06T 15/40 (2011.01)
G06T 15/10 (2011.01)
G06T 15/20 (2011.01)
G06T 15/06 (2011.01)

(52) U.S. Cl. ......... 345/426; 345/419; 345/421; 345/427

(58) Field of Classification Search ........................ None
See application file for complete search history.

(56) References Cited

U.S. PATENT DOCUMENTS

2008/0122841 A1* 5/2008 Brown et al. ................. 345/421
2009/0138876 A1* 5/2009 Chang ........................... 717/176

OTHER PUBLICATIONS

James D. Foley, Andries van Dam, Steven K. Feiner, and John F. Hughes. Computer Graphics principles and Practice. Addison-Wesley Publishing Company, Inc. Reprinted with corrections, Jul. 1997.*
"Reflectance Characteristics of Graphics Objects." http://www.kxcad.net/cae_MATLAB/techdoc/visualize/f1-21818.html. Archived on Dec. 22, 2007. Retrieved on Aug. 4, 2011 from <http://web.archive.org/web/20071222175204/http://www.kxcad.net/cae_MATLAB/techdoc/visualize/f1-21818.html>.*
Andreas Dietrich and Philipp Slusallek. 2008. Massive model visualization using realtime ray tracing. In ACM SIGGRAPH Asia 2008 courses (SIGGRAPH Asia '08). ACM, New York, NY, USA, Article 46, 37 pages.*
"Visualization Lecture: Advance Algorithms—Ray Tracing" http://undergraduate.csse.uwa.edu.au/units/CITS4241/Handouts/Lecture12.html. Archived on Jul. 28, 2008. Retrieved on Feb. 1, 2012 from <http://web.archive.org/web/20080728215300/http://undergraduate.csse.uwa.edu.au/units/CITS4241/Handouts/Lecture12.html>.*

* cited by examiner

*Primary Examiner* — Kee M Tung
*Assistant Examiner* — Zhengxi Liu
(74) *Attorney, Agent, or Firm* — Jim Boice

(57) ABSTRACT

A method, system and computer program product for managing secondary rays during ray-tracing are presented. A non-visible unidirectional ray tracing object logically surrounds a user-selected virtual object in a computer generated illustration. This unidirectional ray tracing object prevents secondary tracing rays from emanating from the user-selected virtual object during ray tracing.

19 Claims, 10 Drawing Sheets

USER-DEFINED NON-VISIBLE GEOMETRY FEATURING RAY FILTERING

BACKGROUND OF THE INVENTION

1. Technical Field

The present disclosure relates to the field of computers, and specifically to computer-generated illustrations. Still more particularly, the present disclosure relates to ray tracing in computer-generated illustrations.

2. Description of the Related Art

Ray tracing is a technique used in computer-generated illustrations and animation to reverse-emulate the properties of light, color, texture, and shading of objects. That is, in order to replicate how images appear to a viewer's eye, a pathway of light coming from a particular image is traced backwards to the image and any other involved objects. For example, consider the scene depicted in FIG. 1. Three spheres are depicted. Sphere 102 is a green sphere, sphere 104 is a blue sphere, and sphere 106 is a red sphere. When illuminated by a light source 108 (e.g., a white light bulb, the sun, etc.), the green, blue and red spheres 102-106 will be visible to a viewer's eye 110. Note, however, that there are several sets of light rays involved in this scenario.

First, there are illumination light rays 112 coming from the light source 108 (assuming that spheres 102-106 are not internally or otherwise self-illuminated). When the illumination light rays 112 strike the green sphere 102, the green sphere 102 absorbs all frequencies of light from the illumination light rays 112 except for those in the green spectrum. Similarly, the blue sphere 104 absorbs all frequencies of light from the illumination light rays 112 except for blue, and the red sphere 106 absorbs all frequencies of light from the illumination light rays 112 except for red. Some of the non-absorbed light from spheres 102-106 is depicted as dashed lines, which are referenced as secondary light rays 114. These secondary light rays 114 cause the spheres 102-106 to be shaded, thus appearing to be colors other than their respective original colors of green, blue, and red. For example, the secondary light ray 115 coming from red sphere 106 "shades" the blue sphere 104, thus causing the blue sphere 104 to appear to be magenta (in compliance with a standard color wheel). Therefore, a final image ray 117 (coming from blue sphere 104 and one of the set of final rays 116) appears to be magenta, rather than blue, to the viewer's eye 110. That is, the final image ray 117 includes both the primary blue rays from the blue sphere 104 as well as reflected red rays from the red sphere 106. Reflected light from the other spheres likewise interact to produce shaded colors for the spheres that are different from their original hues.

Referring now to FIG. 2, an exemplary ray tracing for a computer-generated representation of the scene shown in FIG. 1 is presented. A computer has generated virtual images of the spheres shown in FIG. 1. These virtual spheres are depicted as virtual spheres 202, 204, and 206, and correspond in appearance (shape, size, hue, shading, etc.) to the spheres 102, 104, and 106 shown in FIG. 1. The spheres are contained within a boundary (e.g., a box or "bounding volume") 208. Virtual secondary light rays 214, coming from the virtual spheres 202, 204, and 206 are also generated. In order to present to a viewer (e.g., a camera, a monitor, etc.) 210 the same image as seen by the user's eye 110, rays are backwards traced from the viewer 210 and aligned on a grid 212 for spatial orientation. That is, final virtual rays 216 are traced through the grid 212 from the viewer 210 to the virtual spheres 202-206. When one of the final virtual rays 216 hits an object, a calculation is made to determine the direction in which this ray would bounce off the object. By "seeing" where the ray would bounce (as a virtual secondary light ray 214), a perception is achieved that the object likewise "sees" the other object, and is thus shaded/recolored. As such, the final result is that ray tracing allows a computer artist to mimic how light shading occurs in the real world by back-tracking the final and secondary light rays, thus recreating such shading in the computer-generated image.

As shown in FIG. 2, there are numerous virtual secondary light rays 214. For purposes of simplicity, only a few secondary light rays 214 have been illustrated in FIG. 2. In practice, however, there are tens or hundreds of secondary light rays 214 coming from every object within boundary 208. This large number of secondary light rays 214, and the processing resources required to generate them, can quickly cause a marked degradation in the processing ability of the computer that is generating the virtual images. This degradation can result in pixels breaking up, animation becoming stuttered, and even a crash of the system, resulting in the total loss of the virtual image.

SUMMARY OF THE INVENTION

A method, system and computer program product for managing secondary rays during ray-tracing are presented. A non-visible unidirectional ray tracing object logically surrounds a user-selected virtual object in a computer generated illustration. This unidirectional ray tracing object prevents secondary tracing rays from emanating from the user-selected virtual object during ray tracing.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 3:
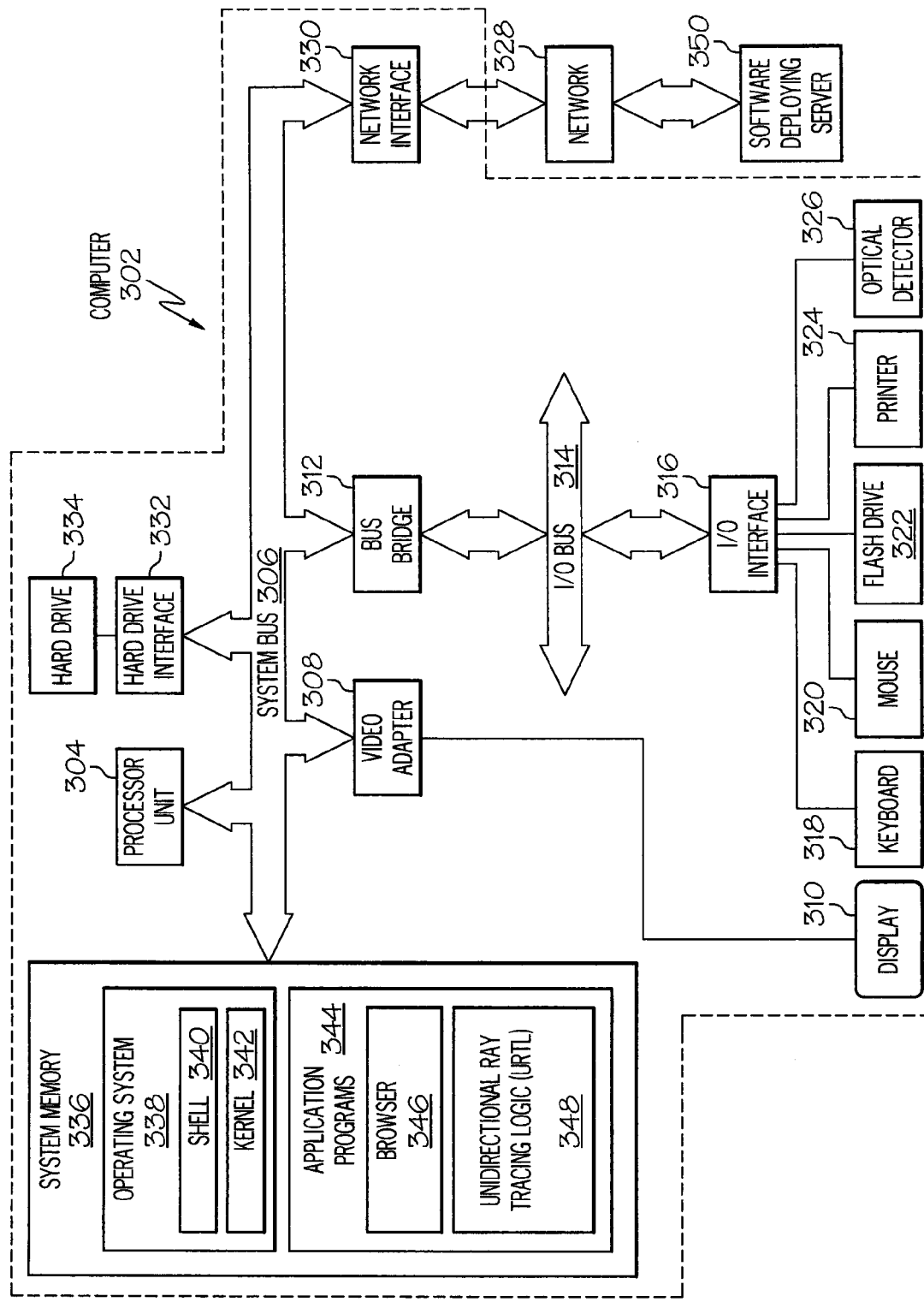
FIG. 3 depicts an exemplary computer which may be utilized by the present invention.

With reference now to FIG. 3, there is depicted a block diagram of an exemplary computer 302, which the present invention may utilize. Note that some or all of the exemplary architecture shown for computer 302 may be utilized by software deploying server 350.

Computer 302 includes a processor unit 304, which may utilize one or more processors each having one or more processor cores, that is coupled to a system bus 306. A video adapter 308, which drives/supports a display 310, is also coupled to system bus 306. System bus 306 is coupled via a bus bridge 312 to an Input/Output (I/O) bus 314. An I/O interface 316 is coupled to I/O bus 314. I/O interface 316 affords communication with various I/O devices, including a keyboard 318, a mouse 320, a Flash Drive 322, a printer 324, and an optical detector 326 (e.g., the viewer 512 described below in FIG. 5). The format of the ports connected to I/O interface 316 may be any known to those skilled in the art of computer architecture, including but not limited to Universal Serial Bus (USB) ports.

Computer 302 is able to communicate with a software deploying server 350 via network 328 using a network interface 330, which is coupled to system bus 306. Network 328 may be an external network such as the Internet, or an internal network such as an Ethernet or a Virtual Private Network (VPN).

A hard drive interface 332 is also coupled to system bus 306. Hard drive interface 332 interfaces with a hard drive 334. In a preferred embodiment, hard drive 334 populates a system memory 336, which is also coupled to system bus 306. System memory is defined as a lowest level of volatile memory in computer 302. This volatile memory includes additional higher levels of volatile memory (not shown), including, but not limited to, cache memory, registers and buffers. Data that populates system memory 336 includes computer 302's operating system (OS) 338 and application programs 344.

OS 338 includes a shell 340, for providing transparent user access to resources such as application programs 344. Generally, shell 340 is a program that provides an interpreter and an interface between the user and the operating system. More specifically, shell 340 executes commands that are entered into a command line user interface or from a file. Thus, shell 340, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 342) for processing. Note that while shell 340 is a text-based, line-oriented user interface, the present invention will equally well support other user interface modes, such as graphical, voice, gestural, etc.

As depicted, OS 338 also includes kernel 342, which includes lower levels of functionality for OS 338, including providing essential services required by other parts of OS 338 and application programs 344, including memory management, process and task management, disk management, and mouse and keyboard management.

Application programs 344 include a renderer, shown in exemplary manner as a browser 346. Browser 346 includes program modules and instructions enabling a World Wide Web (WWW) client (i.e., computer 302) to send and receive network messages to the Internet using HyperText Transfer Protocol (HTTP) messaging, thus enabling communication with software deploying server 350 and other described computer systems.

Application programs 344 in computer 302's system memory (as well as software deploying server 350's system memory) also include a Unidirectional Ray Tracing Logic (URTL) 348. URTL 348 includes code for implementing the processes described below, and particularly as described in FIGS. 4-10. In one embodiment, computer 302 is able to download URTL 348 from software deploying server 350, including in an on-demand basis. Note further that, in one embodiment of the present invention, software deploying server 350 performs all of the functions associated with the present invention (including execution of URTL 348), thus freeing computer 302 from having to use its own internal computing resources to execute URTL 348.

The hardware elements depicted in computer 302 are not intended to be exhaustive, but rather are representative to highlight essential components required by the present invention. For instance, computer 302 may include alternate memory storage devices such as magnetic cassettes, Digital Versatile Disks (DVDs), Bernoulli cartridges, and the like. These and other variations are intended to be within the spirit and scope of the present invention.

Figure 1:
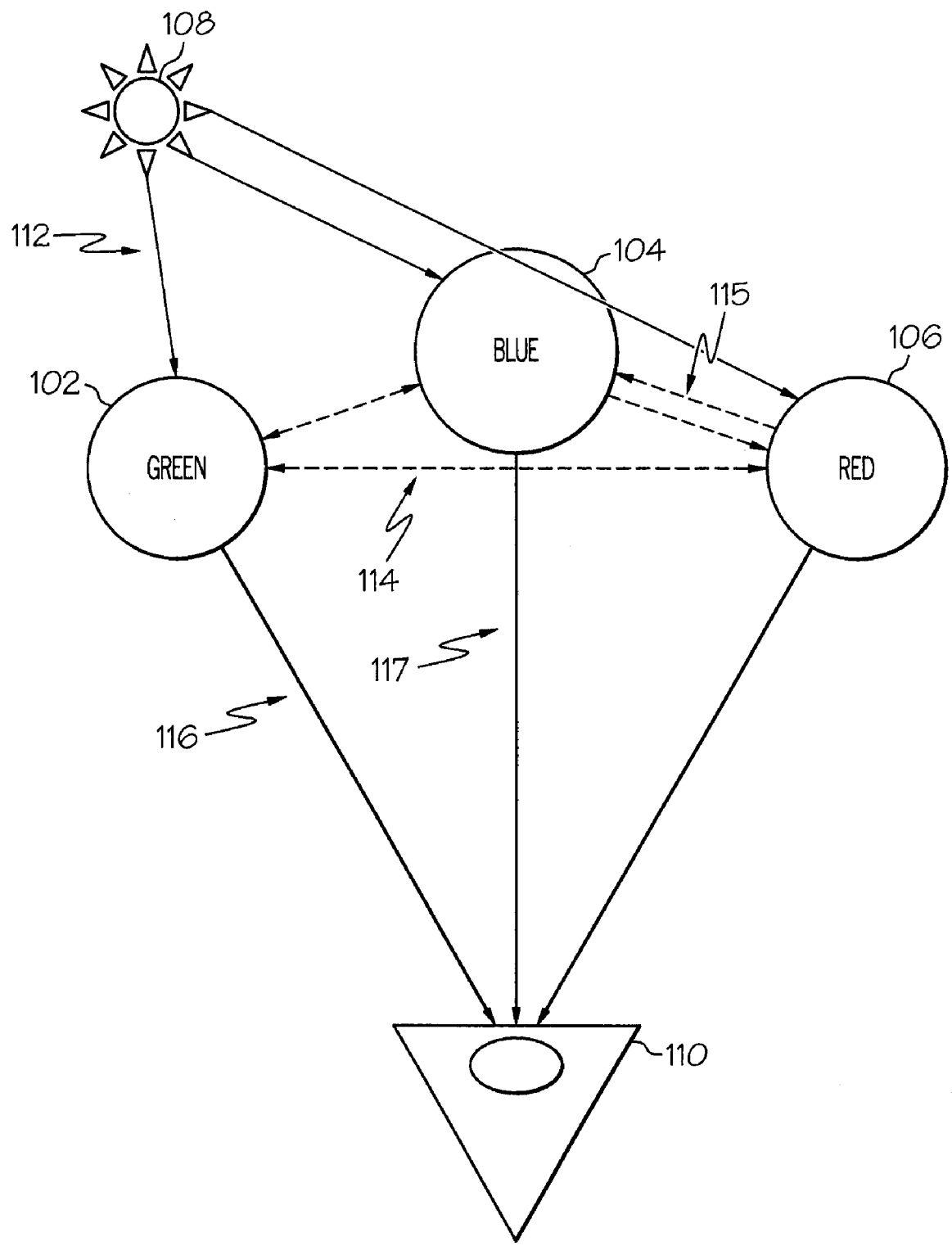
FIG. 1 depicts a prior art real world observation of three real colored spheres.
Figure 2:
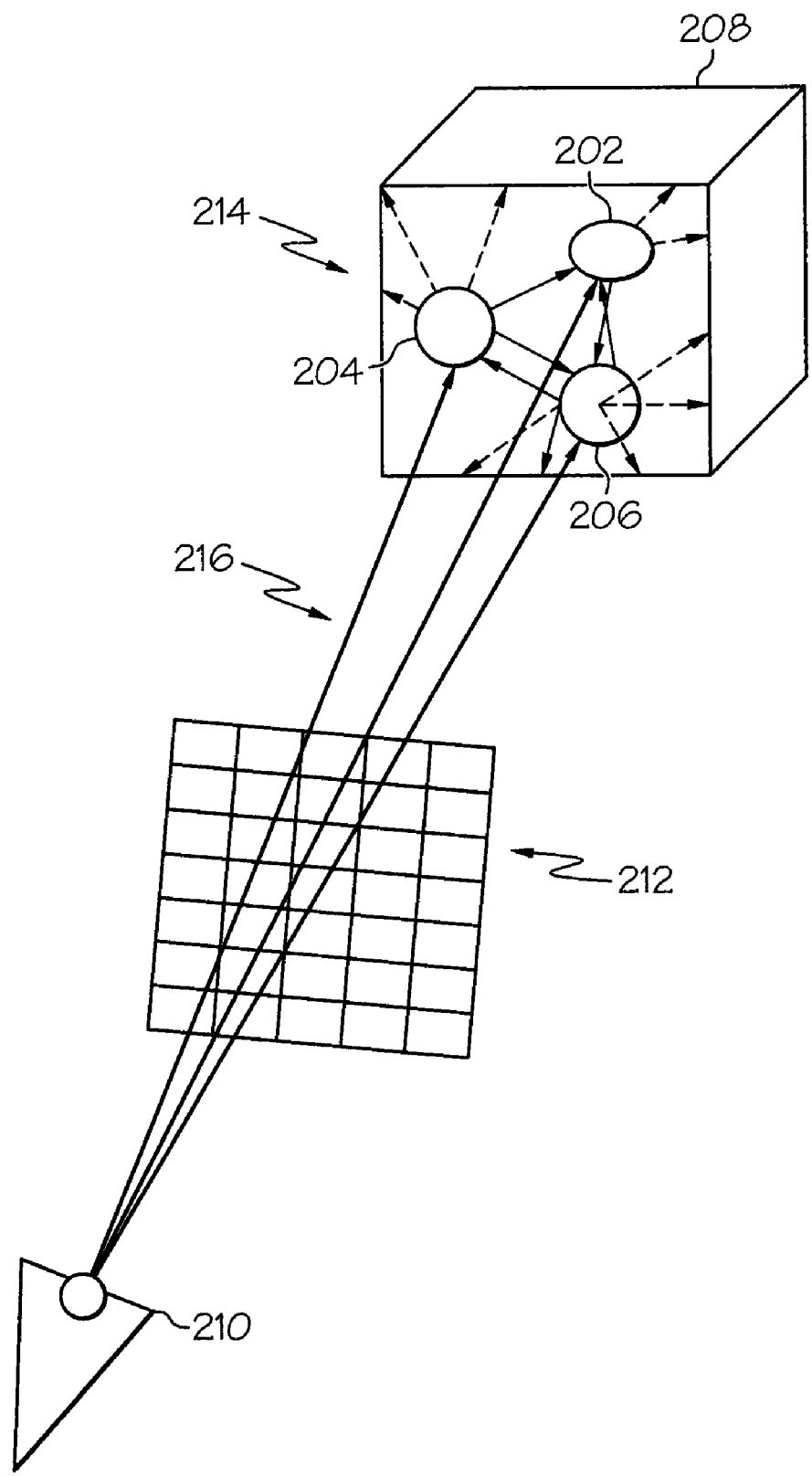
FIG. 2 illustrates a use of ray-tracing with a computer-generated image of the three colored spheres shown in FIG. 1.
Figure 4:
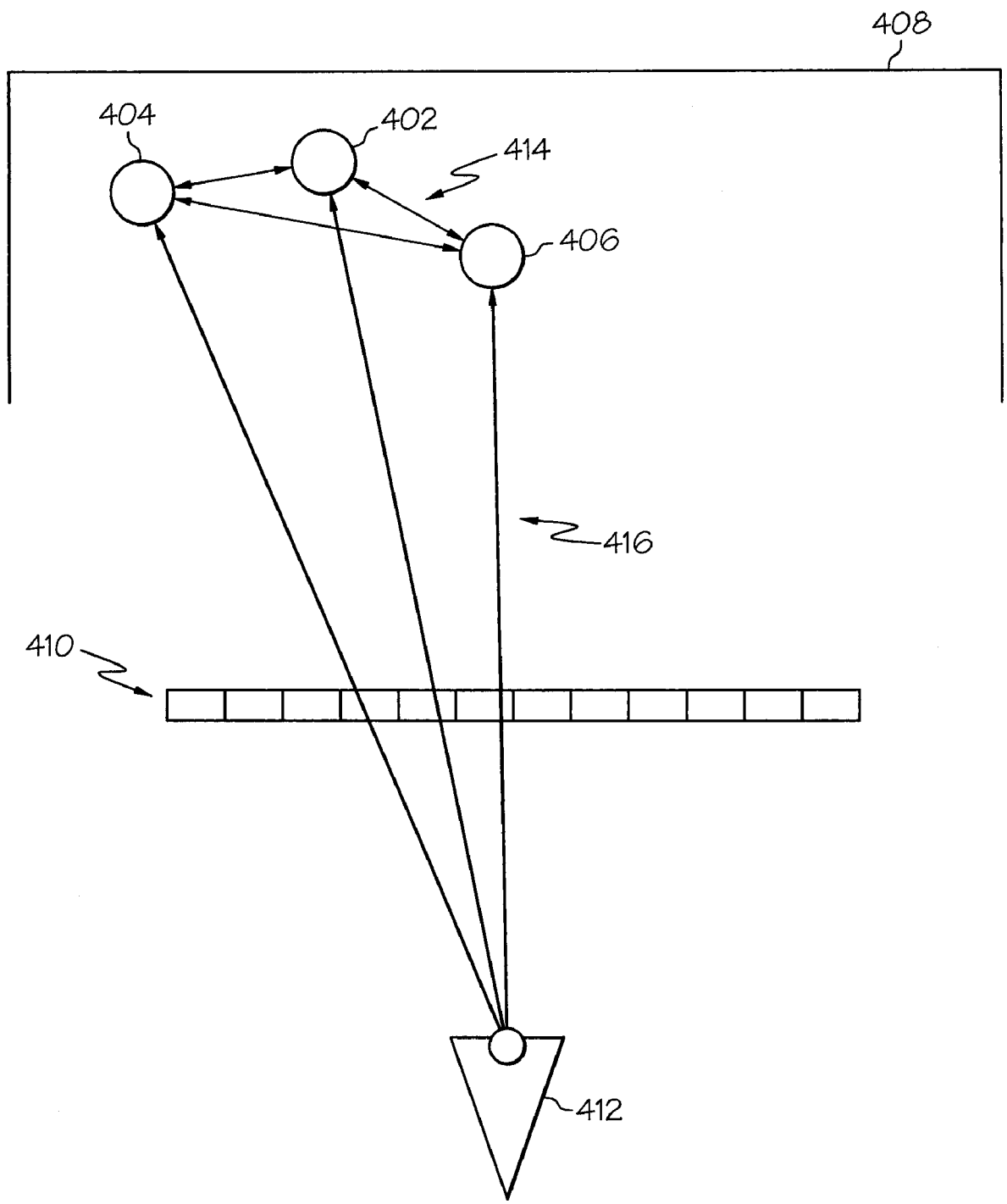
FIG. 4 illustrates a simplified depiction of the ray-tracing shown in FIG. 2.

With reference now to FIG. 4, a simplified version of the ray-tracing depicted in FIG. 2 is presented. As in FIG. 2, a viewer 412 (i.e., an optical detector) traces primary rays 416 through a logical grid 410 towards virtual objects 402, 404, and 406 within a boundary 408. Ray tracing also tracks the secondary rays 414 that emanate from and between each of the virtual objects 402, 404, and 406. In the example shown, virtual object 402 is a green sphere, virtual object 404 is a blue sphere, and virtual object 406 is a red sphere.

Figure 5:
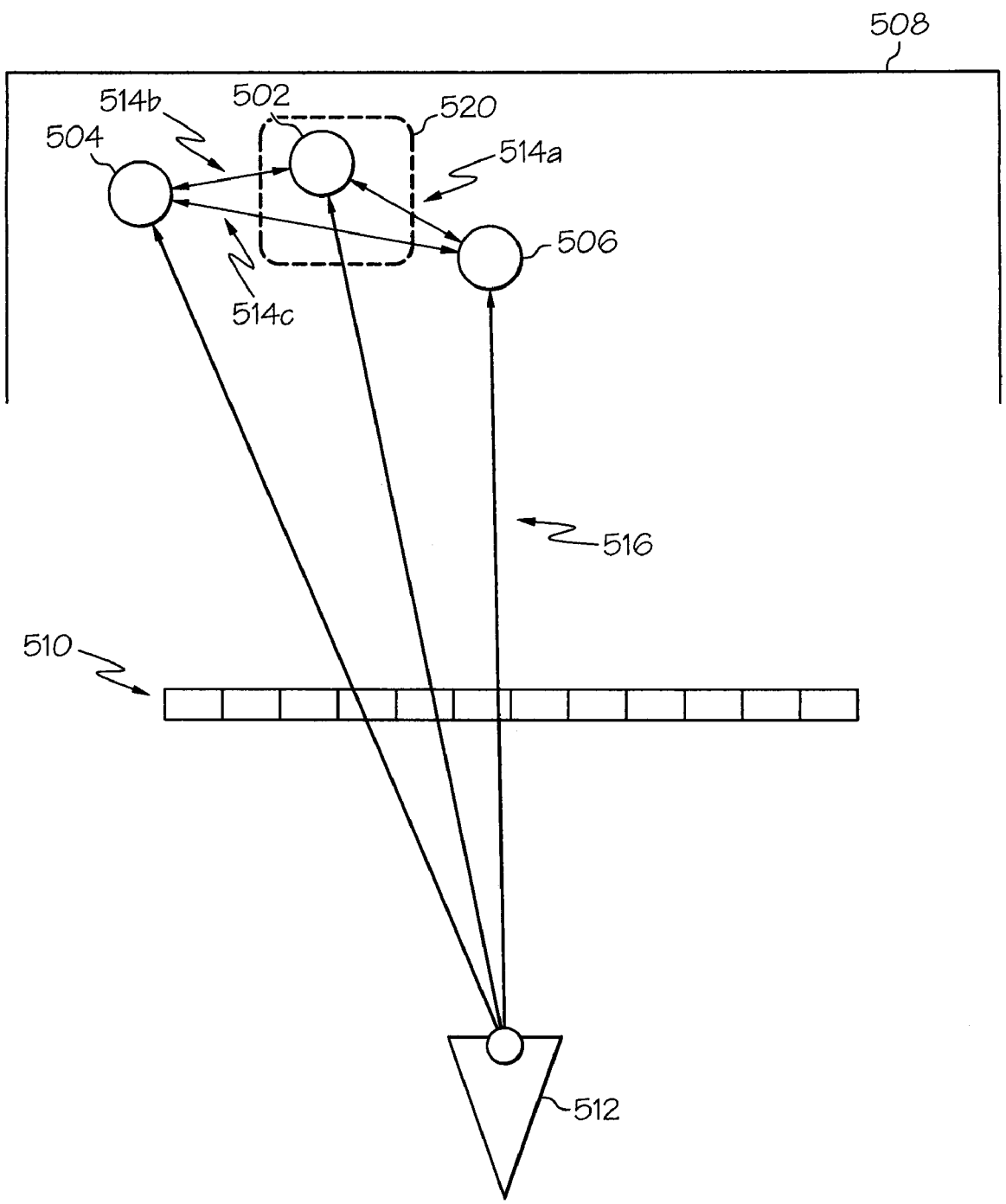
FIG. 5 depicts a use of a novel user-defined non-visible object surrounding a computer-generated image, wherein the non-visible object affords unidirectional ray tracing that prohibits secondary rays from leaving the surrounded computer-generated image.
Figure 6:
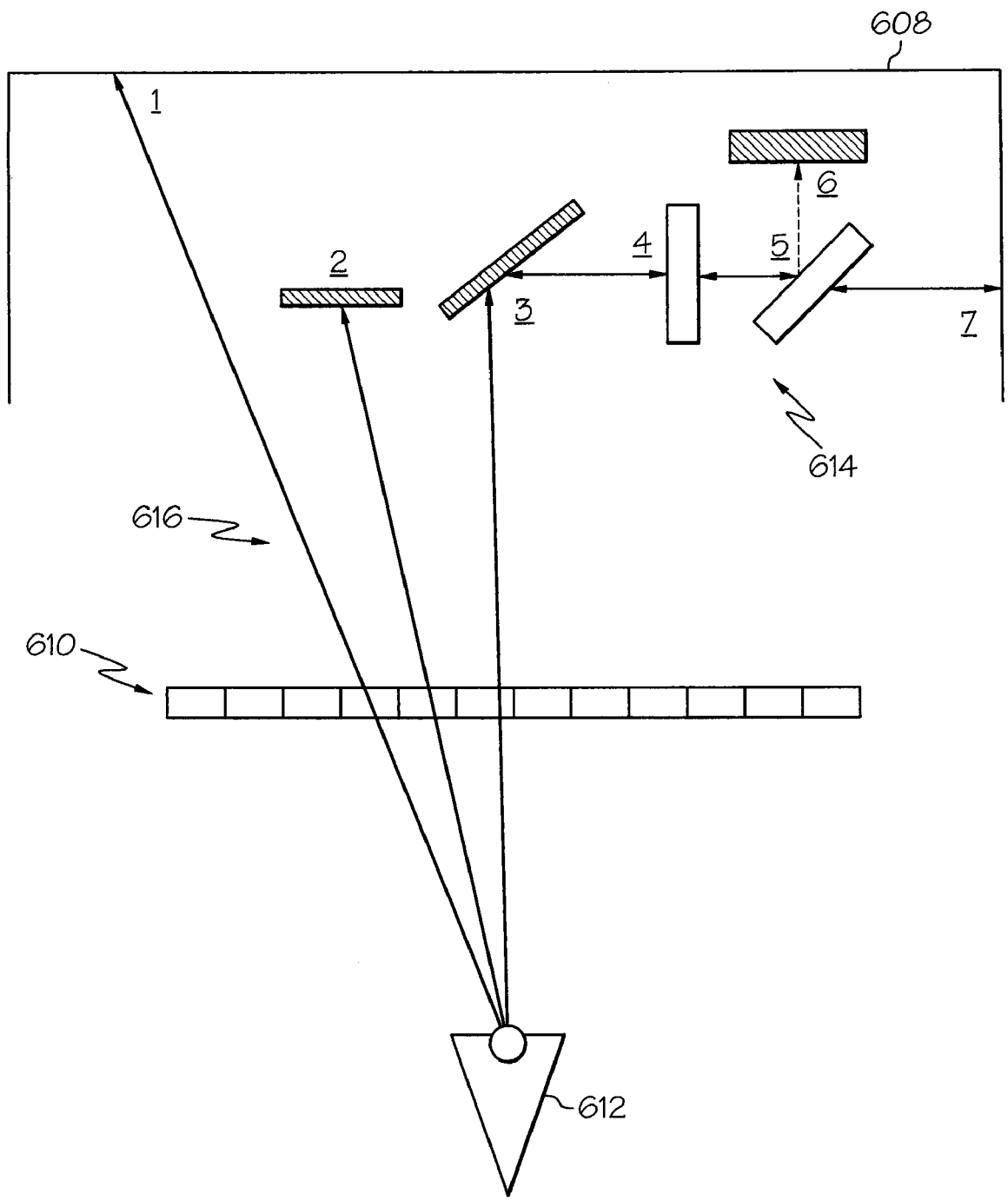
FIG. 6 illustrates a more numerously populated computer-generated image being ray-traced.
Figure 7:
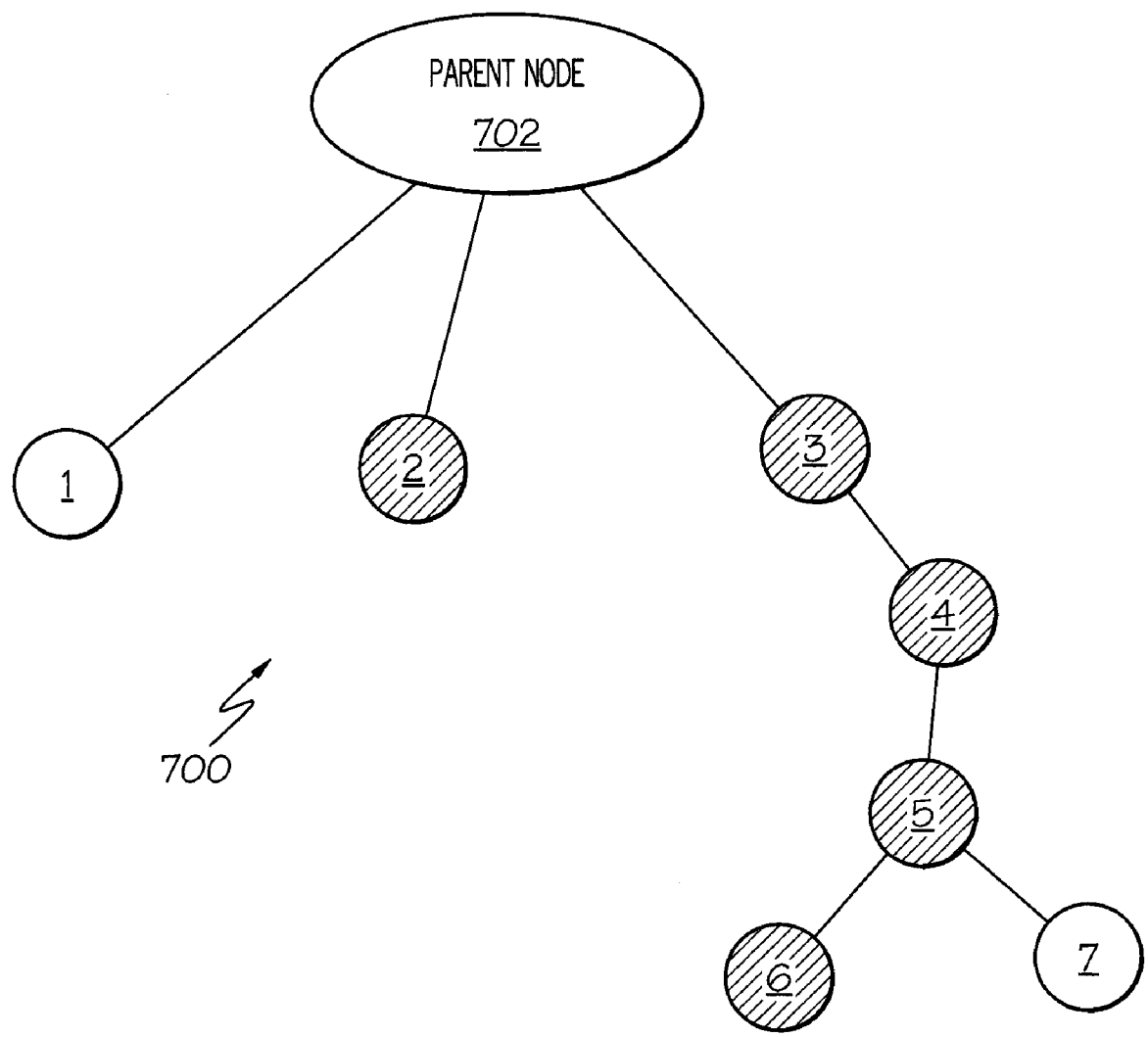
FIG. 7 depicts a tree graph of objects being ray-traced in FIG. 6.

With reference now to FIG. 5, a similar scenario as that shown in FIG. 4 is presented, except that a novel and non-visible unidirectional ray tracing object 520 is logically surrounding a user-selected virtual object 502. Note that unidirectional ray tracing object 520 is not actually visible to a viewer, but rather is an invisible cloak that alters the ray tracing attributes for the user-selected virtual object 502. More specifically, while primary rays 516 are still traced from the viewer 512 through the grid 510 to the virtual objects 502, 504, and 506 (which are similar in initial hue and appearance as the virtual objects 402, 404, and 406 shown in FIG. 4), the unidirectional ray tracing object 520 does not allow any secondary rays to emanate from the surrounded user-selected virtual object 502. Thus, secondary ray 514b is not allowed to emanate from the user-selected virtual object 502, although in one embodiment the secondary ray 514b is allowed to enter ("see" or "trace onto") the user-selected virtual object 502. Similarly, a secondary ray 514b can be traced to, but not from, the user-selected virtual object 502 when viewed from the virtual object 506. Note also that the secondary ray 514c between virtual objects 504 and 506 is unaffected by the unidirectional ray tracing object 520. The unidirectional ray tracing object 520 logically recognizes a geometry of the user-selected virtual object 502. The geometry of the user-selected virtual object 502 includes information on its shape, such as whether it is a sphere, cube, pyramid, or cone and also includes more detailed information, such as whether it is a person, an avatar, or an inanimate object. When the unidirectional ray tracing object 520 is applied to the user-selected virtual object 502, the unidirectional ray tracing object 520 is also able to recognize similar geometries of other virtual objects in the image setting.

Virtual objects within a boundary (logical and virtual two or three-dimensional space) can be graphed in order to determine which objects can utilize a unidirectional ray tracing object. For example, consider the boundary 608 shown in FIG. 6, which includes virtual objects 1-7 that are ray traced from a viewer 612 and mapped onto a grid 610 using primary rays 616 and secondary rays 614. Object 1 is nothing, since a first primary ray 616 is "aimed" at nothing within the boundary 608. Thus, object 1 is depicted on a graph 700 shown in FIG. 7 as an open node. Object 2 is a virtual object that is oriented such that it neither emits nor receives any secondary rays, but is only ray-traced by a second primary ray 616. Thus, object 2 is depicted on the graph 700 shown in FIG. 7 as another non-leaf node (similar to object 1), but is shaded due to object 2 being an actual object (instead of a null, as in object 1). Object 3 is ray-traced by a third primary ray 616, and also has secondary rays 614 between itself and object 4, and is thus depicted in graph 700 as an intermediate node. Objects 4-5 are also intermediate objects (having transparent and/or refractory characteristics), and are thus depicted in graph 700 as intermediate nodes. Object 6 is a purely reflective object, and thus is depicted as a shaded leaf node in graph 700. Object 7 is also a terminal object depicted as a leaf node, but, like object 1, is a null (nothing is there), thus is depicted as an open leaf node in graph 700.

Figure 8:
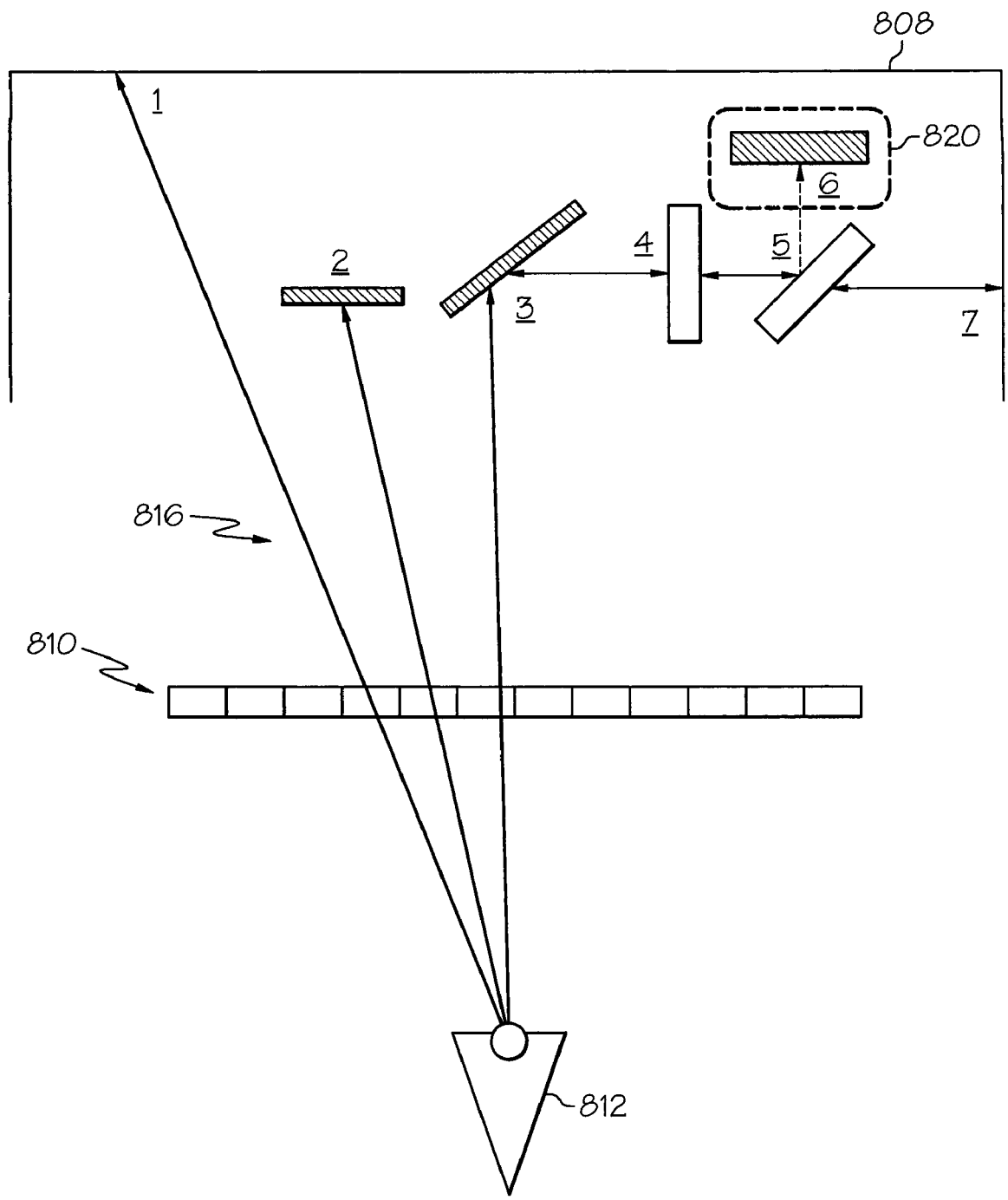
FIG. 8 illustrates the more numerously populated computer-generated image of FIG. 6 having the novel ray filter surrounding one of the objects.
Figure 9:
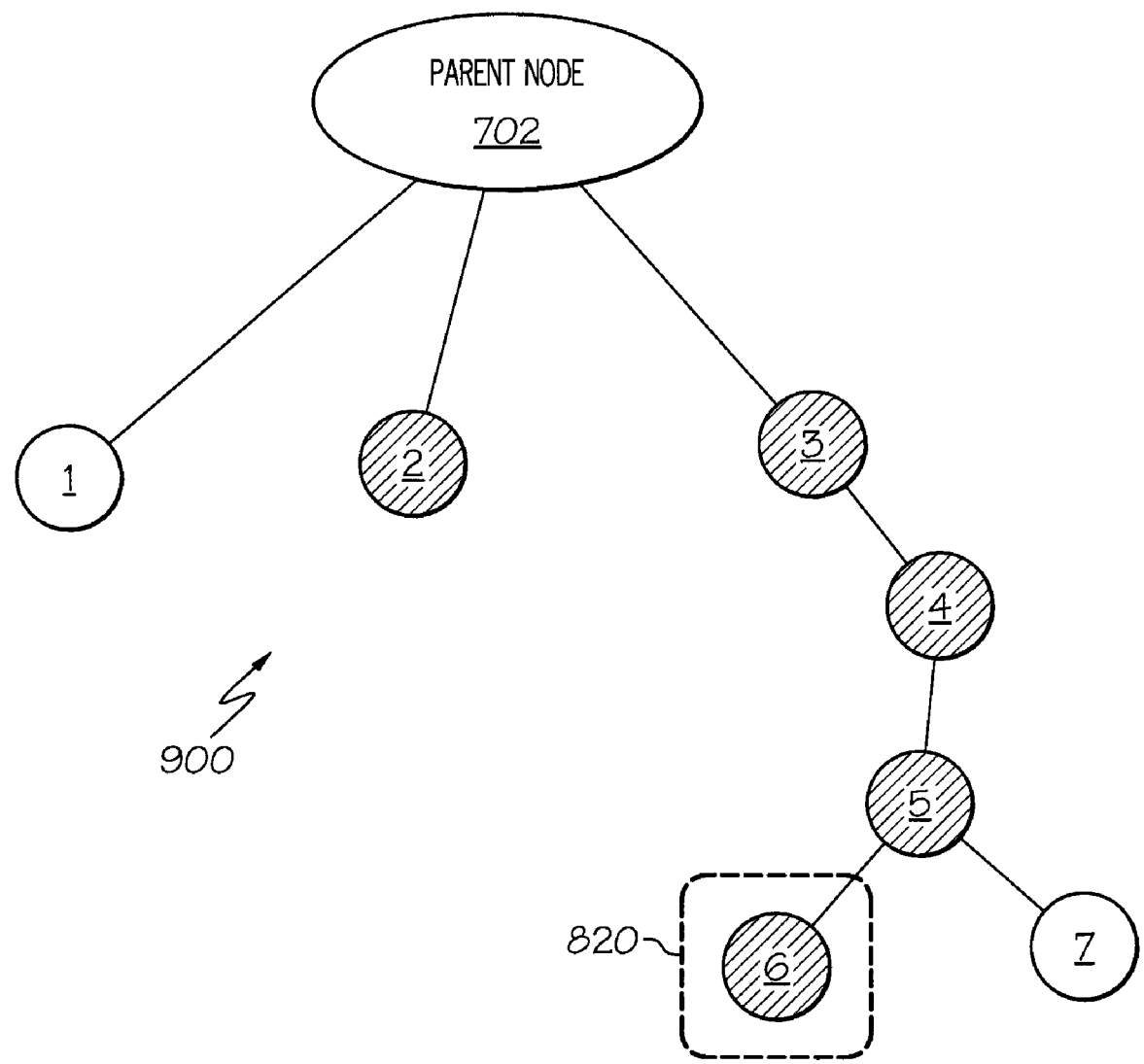
FIG. 9 depicts a tree graph of objects being ray-traced in FIG. 8.

Thus, in one embodiment of the present invention, only leaf nodes (representing actual virtual objects) are candidates for being logically surrounded by a unidirectional ray tracing object. That is, a virtual object should be a terminal object (represented by a leaf node on a tree graph), since this type of object would be least affected by losing its ability to ray trace secondary rays. Thus, as depicted in FIG. 8, a boundary 808 contains objects 1-7, which are the same objects 1-7 described in FIG. 7. Ray tracing occurs from a viewer 812 (e.g., a camera, a virtual eye, etc) using primary rays 816, which are mapped onto a grid 810. Now, however, a unidirectional ray tracing object 820 logically surrounds object 6. FIG. 9 depicts a graph 900 that represents the condition shown in FIG. 8.

Alternatively, a unidirectional ray tracing object 820 could also be used to efficiently illustrate a self-illuminated virtual object in both a still or an animated setting. An object that is illuminated from within, or glows, always has the same hue and illuminates other objects in the virtual setting. However, it should not receive shading or color from the other virtual objects. When the unidirectional ray tracing object 820 logically surrounds the self-illuminated virtual object, it prevents the reception of any secondary rays from other objects while allowing the self-illuminated virtual object to project rays outward.

Figure 10:
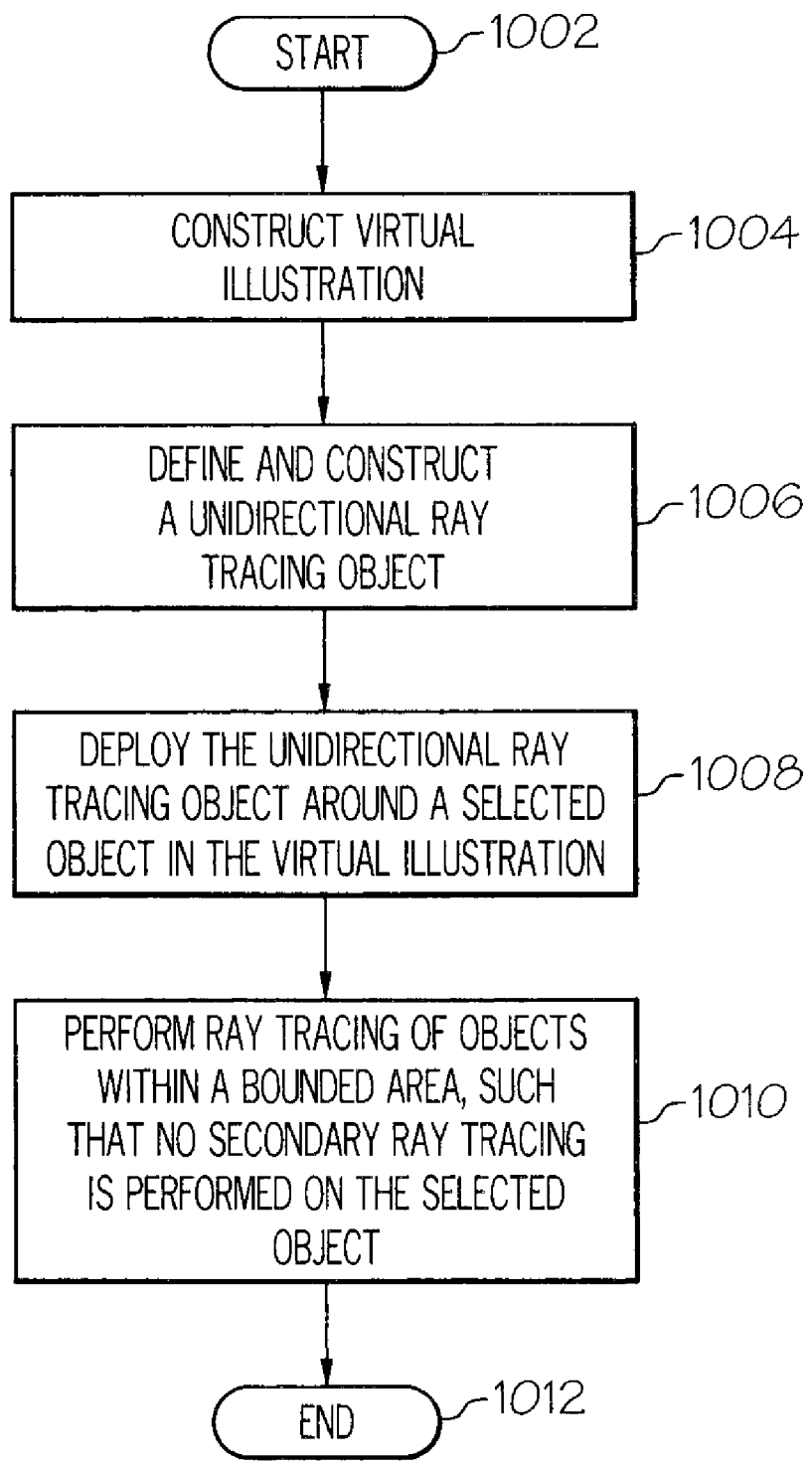
FIG. 10 is a high-level flow chart of exemplary steps taken to create and utilize a unidirectional ray filter in accordance with the present invention.

Referring now to FIG. 10, a high-level flow chart depicting exemplary steps taken to create and utilize a unidirectional ray tracing object to control secondary tracing rays is presented. After initiator block 1002, a virtual illustration is constructed (block 1004). This virtual illustration may be any visual creation, including still images, animation, drafting, etc. A unidirectional ray tracing object is then defined by a user and constructed by a computer (block 1006). This unidirectional ray tracing object prevents secondary rays from emanating from an associated virtual object in the virtual illustration, but, in one embodiment, may allow secondary rays to enter (ray trace) into the surrounded associated virtual object. Furthermore, the unidirectional ray tracing object may permanently assign and fix a visual appearance of the user-selected virtual object. This visual appearance is not affected by other virtual objects within the computer generated illustration, although it may be created with the environment in mind. For example, the unidirectional ray tracing object may shade a particular virtual object, which is surrounded by the unidirectional ray tracing object, to take on a particular hue. This hue may be based on proximate virtual objects, but the hue will remain even if the surrounded particular virtual object moves away from these initially proximate virtual objects. Consider, for example, that the user-selected virtual object is initially next to many red objects. The unidirectional ray tracing object may then force the user-selected virtual object to take on a red hue. However, when the user-selected virtual object moves away from the initially proximate virtual objects (e.g., in an animation sequence), the user-selected virtual object will still maintain a red hue, thus permitting it to maintain a fixed visual feature. In other embodiments, the unidirectional ray tracing object will cause (when logically surrounding the user-selected virtual object) the user-selected virtual object to permanently take on a visual appearance that has a particular pre-defined brightness shading, texture (e.g., mesh or screen appearance), shading (e.g., shadow or shine), etc.

Continuing with the flow-chart shown in FIG. 10, the unidirectional ray tracing object is deployed (logically surrounds) a selected virtual object in the virtual illustration (block 1008). In one embodiment, the unidirectional ray tracing object is also automatically deployed to any other virtual object within the virtual illustration that has a same geometry as the user-selected virtual object. Ray tracing then begins (block 1010). As described above, the unidirectional ray tracing object prevents secondary tracer rays from emanating away from the virtual object that is logically surrounded by (associated with; deployed to) the unidirectional ray tracing object. The process ends at terminator block 1012.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made therein without departing from the spirit and scope of the invention.

Furthermore, as used in the specification and the appended claims, the term computer or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implemented method of managing secondary rays in a ray-tracing process, the computer-implemented method comprising:
   defining and constructing a unidirectional ray tracing object, wherein the unidirectional ray tracing object prevents secondary tracing rays from emanating from a user-selected virtual object in a computer generated illustration;
   logically surrounding the user-selected virtual object with the unidirectional ray tracing object;
   generating a tree graph of multiple virtual objects in the computer-generated illustration;
   in response to detecting another virtual object in the computer generated illustration that has a same shape as the user-selected virtual object, automatically applying the unidirectional ray tracing object to said another virtual object, wherein said automatically applying applies the unidirectional ray tracing object only to virtual objects that are depicted as leaf nodes on the tree graph, and wherein the leaf nodes represent purely reflective virtual objects whose secondary tracing rays align exactly with primary tracing rays that strike the purely reflective virtual objects; and
   ray tracing virtual secondary rays in the computer generated illustration, wherein the unidirectional ray tracing object prevents secondary rays from emanating from the user-selected virtual object.

2. The computer-implemented method of claim 1, wherein the unidirectional ray tracing object fixes a visual appearance of the user-selected virtual object, and wherein the visual appearance is not affected by other virtual objects within the computer generated illustration.

3. The computer-implemented method of claim 2, wherein the visual appearance is a hue shading and wherein the hue shading is pre-calculated based on hues of surrounding virtual objects that are represented as being proximate to the user-selected virtual object.

4. The computer-implemented method of claim 2, wherein the visual appearance is a brightness shading.

5. The computer-implemented method of claim 2, wherein the visual appearance is a texture.

6. The computer-implemented method of claim 1, wherein said same shape has a non-human form.

7. The computer-implemented method of claim 1 wherein the computer-generated illustration is a still image.

8. The computer-implemented method of claim 1. wherein the computer-generated illustration is a moving scene.

9. The computer-implemented method of claim 1, further comprising:
   automatically applying the unidirectional ray tracing object to any other virtual object in the computer generated illustration that has been defined as being self-illuminating.

10. The computer-implemented method of claim 1, further comprising:
    allowing secondary rays to ray trace into the user-selected virtual object from other virtual objects within the computer-generated illustration, wherein tracer rays are allowed to enter but not exit the user-selected virtual object.

11. A system comprising:
    a video display;
    a system bus coupled to the video display;
    a processor coupled to the system bus; and
    a memory coupled to the processor, wherein the memory contains computer-executable instructions that, when executed, perform the process of:
    defining and constructing a unidirectional ray tracing object, wherein the unidirectional ray tracing object prevents secondary tracing rays from emanating from a user-selected virtual object in a computer generated illustration;
    logically surrounding the user-selected virtual object with the unidirectional ray tracing object;
    generating a tree graph of multiple virtual objects in the computer-generated illustration;
    in response to detecting another virtual object in the computer generated illustration that has a same shape as the user-selected virtual object, automatically applying the unidirectional ray tracing object to said another virtual object, wherein said automatically applying applies the unidirectional ray tracing object only to virtual objects that are depicted as leaf nodes on the tree graph, and wherein the leaf nodes represent purely reflective virtual objects whose secondary tracing rays align exactly with primary tracing rays that strike the purely reflective virtual objects; and
    ray tracing virtual secondary rays in the computer generated illustration, wherein the unidirectional ray tracing object prevents secondary rays from emanating from the user-selected virtual object.

12. The system of claim 11, wherein the unidirectional ray tracing object fixes a visual appearance of the user-selected virtual object, and wherein the visual appearance is not affected by other virtual objects within the computer generated illustration.

13. The system of claim 12, wherein the visual appearance is a hue shading.

14. The system of claim 13, wherein the hue shading is pre-calculated based on hues of surrounding virtual objects that are represented as being proximate to the user-selected virtual object.

15. A non-transitory computer-readable storage medium on which is encoded a computer program, the computer program comprising computer executable instructions configured for:
    defining and constructing a unidirectional ray tracing object, wherein the unidirectional ray tracing object prevents secondary tracing rays from emanating from a user-selected virtual object in a computer generated illustration;
    logically surrounding the user-selected virtual object with the unidirectional ray tracing object;
    generating a tree graph of multiple virtual objects in the computer-generated illustration;
    in response to detecting another virtual object in the computer generated illustration that has a same shape as the user-selected virtual object, automatically applying the unidirectional ray tracing object to said another virtual object, wherein said automatically applying applies the unidirectional ray tracing object only to virtual objects that are depicted as leaf nodes on the tree graph, and wherein the leaf nodes represent purely reflective virtual objects whose secondary tracing rays align exactly with primary tracing rays that strike the purely reflective virtual objects; and
    ray tracing virtual secondary rays in the computer generated illustration, wherein the unidirectional ray tracing object prevents secondary rays from emanating from the user-selected virtual object.

16. The non-transitory computer-readable storage medium of claim 15, wherein the unidirectional ray tracing object fixes a visual appearance of the user-selected virtual object, and wherein the visual appearance is not affected by other virtual objects within the computer generated illustration.

17. The non-transitory computer-readable storage medium of claim 16, wherein the visual appearance is a hue shading.

18. The non-transitory computer-readable storage medium of claim 17, wherein the hue shading is pre-calculated based on hues of surrounding virtual objects that are represented as being proximate to the user-selected virtual object.

19. The non-transitory computer-readable storage medium of claim 15, wherein the computer executable instructions are provided by a service provider to a customer in an on-demand basis.

* * * * *